C. H. Weston.
Hose Pipe Coupling.
No. 87,993. Patented Mar. 16, 1869.
Fig. 1.
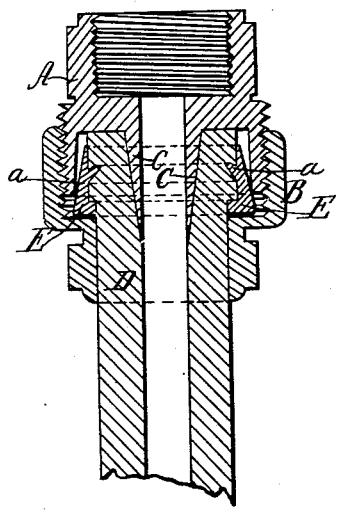
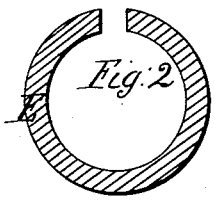
Fig. 2.
Witnesses:
A. A. Yeatman
Leopold Guest
Inventor,
C. H. Weston
per Alexander & Mason
Attys

C. H. WESTON, OF LOWELL, MASSACHUSETTS.

Letters Patent No. 87,993, dated March 16, 1869; antedated November 18, 1868.

IMPROVEMENT IN HOSE AND PIPE-COUPLING.

The Schedule referred to in these Letters Patent and making part of the same.

*To all whom it may concern:*

Be it known that I, C. H. WESTON, of Lowell, in the county of Middlesex, and in the State of Massachusetts, have invented certain new and useful Improvements in Hose and Pipe-Coupling; and do hereby declare that the following is a full, clear, and exact description thereof, reference being had to the accompanying drawings, and to the letters of reference marked thereon.

The nature of my invention consists in the construction of a "hose and pipe-coupling," which shall be both self-packing and self-fastening.

In order to enable others skilled in the art to which my invention appertains to make and use the same, I will now proceed to describe its construction and operation, referring to the annexed drawings, which form a part of this specification, and in which—

Figure 1 is a side view, in section, of my coupling, and

Figure 2 is a plan view of the ring used therein.

A and B represent the two coupling-rings, one of which is provided with a male and the other with a female screw, in the same manner as any ordinary coupling.

The coupling-ring A is, on the inside, provided with a tapering-tube, C, which is inserted into the end of the pipe D, as shown in fig. 1.

My improvement to make a self-packing and self-fastening coupling, consists in the open tapering ring E, which is placed around the pipe D, and extends partly into the coupling-ring A.

This ring, E, is provided on the inside with a circular flange, a, projecting inward and inclining toward the tapering end of the ring. When the ring E is placed around the pipe D, and inserted in the coupling-ring A, it will be seen that the ring E only touches the coupling-ring A at the outer edge, and that the flange a, on the inside of the ring E, presses into the pipe.

When, now, the other coupling-ring B is put on, and screwed on to the ring A, the ring E is forced down into the coupling-ring A, and, being open and tapering, it presses tightly around the pipe, and presses the pipe tightly around the tube C, at the same time the flange a holds the pipe firmer and firmer in the coupling-ring A, thus making, as I have claimed, a complete "self-packing" and "self-fastening" coupling.

The pipe may be made of any material generally used, such as lead, rubber, copper, or leather.

The ring E, instead of being made open, as above described, may be made whole, and in that case, it will act on the dovetail-principle, the coupling-ring being shaped so as to conform to the shape of the same; or, if desired, the ring E may be constructed of two or more pieces, and made fast by driving it up either by screws or cams.

Having thus fully described my invention,

What I claim as new, and desire to secure by Letters Patent, is—

The combination of the open wedge-shaped metal ring E, with an inner circumferential shoulder and flange, a, as shown, with the rings A B, tube C, and flexible hose D, all substantially as set forth.

In testimony that I claim the foregoing, I have hereunto set my hand, this 10th day of November, 1868.

C. H. WESTON.

Witnesses:
FRANCIS GOWARD,
LEOPOLD EVERT.